United States Patent [19]

Park et al.

[11] 4,249,234

[45] Feb. 3, 1981

[54] PORTABLE LUMINAIRE WITH FLUORESCENT LANTERN

[76] Inventors: Sae-Soon Park, 307 Dongjak-dong, Gwanak-gu, Seoul; Han-Joo Jung, 139-144 Kaebong-dong, Yungdeungpo-gu, Seoul, both of Rep. of Korea

[21] Appl. No.: 924,847

[22] Filed: Jul. 14, 1978

[30] Foreign Application Priority Data

Aug. 24, 1977 [KR] Rep. of Korea .................. 5089

[51] Int. Cl.$^3$ ............................................. F21L 7/00
[52] U.S. Cl. ................................. 362/228; 362/184
[58] Field of Search ............. 362/157, 184, 194, 195, 362/202-206, 228

[56] References Cited

U.S. PATENT DOCUMENTS

| | | | |
|---|---|---|---|
| 2,441,399 | 5/1948 | Reamer et al. | 362/228 |
| 2,915,744 | 12/1959 | Lewis | 362/205 X |
| 3,331,958 | 7/1967 | Adler | 362/157 |

FOREIGN PATENT DOCUMENTS 349700  7/1960  Switzerland .................. 362/228

OTHER PUBLICATIONS

The Magazine of Light; Apr. 1936, pp. 28 and 29.

*Primary Examiner*—J. V. Truhe
*Assistant Examiner*—Shelley Wade
*Attorney, Agent, or Firm*—Blanchard, Flynn, Thiel, Boutell & Tanis

[57] ABSTRACT

A portable electric lamp structure having a housing, a substantially parabolic reflector mounted on the housing, an incandescent lamp positioned substantially at the focal part of said parabolic reflector, a self-contained direct-current electric power source positioned within the housing, and manual switch means for electrically connecting the power source to the incandescent lamp for energizing same. A curved reflector is disposed adjacent the outer free edge of the parabolic reflector and extends radially outwardly therefrom. A ringlike fluorescent lamp is positioned in front of the curved reflector in concentric relationship with the parabolic reflector, and an inverter is electrically connected to the fluorescent lamp for converting direct current to alternating current. The switch means is electrically connected between the power source and the inverter.

2 Claims, 5 Drawing Figures

PORTABLE LUMINAIRE WITH FLUORESCENT LANTERN

FIELD OF THE INVENTION

The present invention relates to a portable self-contained electric lamp, such as a flashlight, and particularly to an improved lamp employing both incandescent and fluorescent light sources which can be individually or jointly energized to permit directional or diffused illumination.

BACKGROUND OF THE INVENTION

The conventional portable electric lamp, such as a conventional flashlight, provides an incandescent light source located approximately at the focus of a parabolic reflector, which results in a concentrated beam of light being reflected outwardly of the flashlight in the axial direction of the reflector. This conventional structure thus provides illumination which is directionally concentrated, and is effective for projecting the light over a substantially long distance. With this conventional structure, however, it is not possible to diffuse the light uniformly over a rather large transverse area. For example, with such a conventional flashlight or portable lamp, if same is hung in a suspended condition, the lamp will not result in uniform lighting of the interior of a room or space, but rather will effectively light only the region directly below the lamp due to the directional concentration.

Therefore, it is an object of the present invention to provide a portable electric lamp which can be used in a conventional manner so as to provide a directional concentration of light effective over a long distance, but which is also capable of providing effective transverse diffusion of light over a short distance so as to provide for substantial and rather uniform lighting of a rather large area which is spaced a relatively short distance from the lamp.

A further object of this invention is to provide an improved portable lamp, as aforesaid, which can be selectively utilized to create a long-distance directional light or a short-distance sideward diffusion of light, with these two modes of operation being selectively usable either independently or jointly.

Another object is to provide an improved portable lamp, as aforesaid, which employs a first light source in the form of a conventional incandescent lamp positioned substantially at the focus of a parabolic reflector so as to provide a long-distance directional light beam, and a second light source formed as a ringlike fluorescent lamp positioned substantially adjacent and in surrounding relationship to the outer edge of the parabolic reflector so as to provide for substantially uniform sideward diffusion of light over a large transverse area.

Other objects and purposes of the invention will be apparent upon reading the following description and inspecting the accompanying drawings.

DETAILED DESCRIPTION

Figure 1:
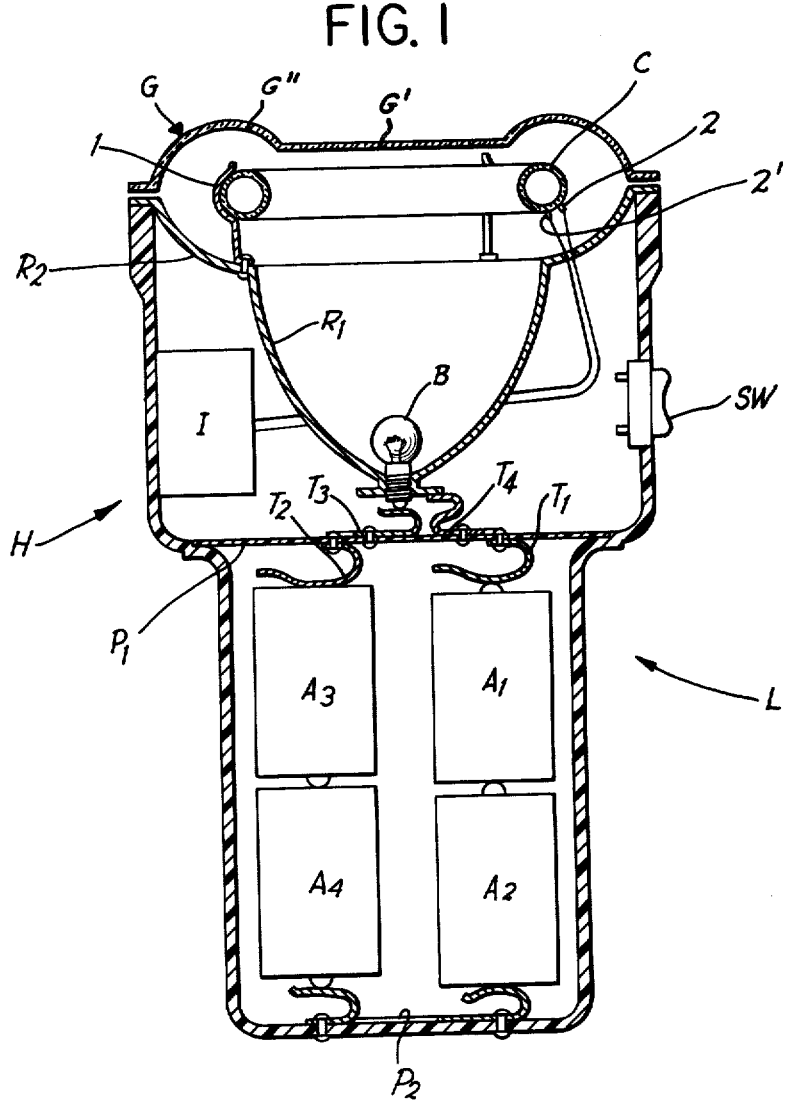
FIG. 1 is a central sectional view of an embodiment of the improved portable electric lamp according to the present invention.

As illustrated in FIG. 1, the portable electric lamp means L of the present invention includes an outer housing or casing H which is normally constructed of an electrically nonconductive material. Long-distance directional lighting is accomplished by a conventional incandescent lamp B which is positioned at the focus, or in the focal part, of a conventional parabolic reflector $R_1$, which reflector is positioned within and stationarily mounted relative to the housing H. Short-distance diffused lighting is accomplished by a ring-shaped fluorescent lamp C which is positioned adjacent the free end of the parabolic reflector $R_1$, the lamp C being of a size similar to the outer diameter of reflector $R_1$ so as to not interfere with the directional light beam reflected therefrom. The fluorescent lamp C, which is supported by a plurality of circumferentially spaced spring clips 1, has a curved reflector $R_2$ positioned therebehind. This curved reflector $R_2$ has a curved concave reflecting surface which is shaped similar to a bowl so that the fluorescent lamp C is arranged inside of this reflector. This reflector $R_2$ is fixedly connected to the outer edge of the parabolic reflector $R_1$, with the reflector $R_2$ curving radially and axially outwardly therefrom so that the outer flange on the reflector $R_2$ overlies the free end of the housing.

The lamps B and C are selectively and individually energized by a manually actuated switch structure $S_w$ which is associated with the side wall of the housing. This switch structure includes a pair of manually actuated switches $S_b$ and $S_c$. The switch $S_b$ is provided for controlling energization of the incandescent lamp B, and the switch $S_c$ is interconnected through the inverter I for permitting selective energization of the fluorescent lamp C. These switches $S_b$ and $S_c$ may be individually actuated to energize either lamp B or lamp C, or may be jointly actuated to simultaneously energize both lamps.

To energize the lamps B or C, the portable lamp means L provides a power source which, in the illustrated embodiment, comprises eight batteries, such as conventional 1.5 volt batteries, designated A1–A8 in the drawings. It will be recognized that any conventional battery or dry cell can be utilized as the power source.

As illustrated in FIG. 1, the parabolic reflector $R_1$ and curved reflector $R_2$ are shown integral as one body, although it will be appreciated that these reflectors can be formed as separate elements and then suitably joined together.

As also shown in FIG. 1, a transparent lens G, such as of glass, is stationarily but removably mounted on the end of the housing, as by conventional techniques, so as to close off the housing and protect the interior components.

The lens G, as shown by FIG. 1, has a substantially planar center portion G' which is of a size similar to the maximum diameter of the parabolic reflector $R_1$, this center portion being disposed aligned with the parabolic reflector and substantially wholly within the inner diameter of the fluorescent lamp C, whereby this flat portion G' thus permits a concentrated beam of light to be projected outwardly in a substantially conventional manner when the incandescent lamp B is energized. The outer portion G" of the lens, namely that portion disposed in surrounding relationship to the center portion G', is provided with an arcuate or a smoothly and outwardly curved cross section when viewed in a radial plane, which smoothly curved or convex portion of the lens G" extends completely around the lens and cooperates with the reflector $R_2$ so as to define an enlarged annular cavity in which the fluorescent lamp C is positioned. This annular convex portion G" of the lens, and the positioning of the fluorescent lamp C substantially within this curved portion G" directly adjacent the free end of the housing, thus provides for a substantially uniform sideward diffusion of light over a large transverse area when the fluorescent lamp C is energized.

Figure 2:
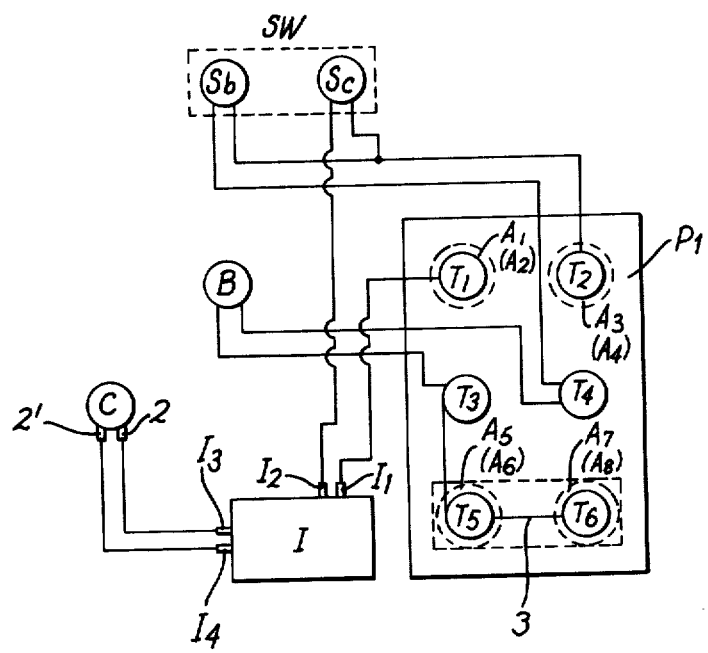
FIG. 2 is a circuit diagram for the lamp of FIG. 1.

The electrical circuitry of the portable lamp means L will now be explained with reference to FIG. 2.

The terminals $T_1$ and $T_2$ are connected to the batteries, the terminals $T_3$ and $T_4$ are connected to the incandescent lamp B, and the terminals $T_5$ and $T_6$ are connection terminals which are joined by the conductor 3 to provide a series coupling of the group of batteries A1, A2, A5, A6 with the group of batteries A7, A8, A4, A3. This conductor 3 is located on the opposite of the upper terminal plate $P_1$ as indicated by dotted lines in FIG. 2. The power source terminal $T_2$ is series connected with the terminal $T_4$ of the incandescent lamp B through the switch $S_b$ as shown in FIG. 2, and the other terminal $T_3$ interconnects the incandescent lamp B back to the power source (such as to the battery A6) so as to complete the circuit for permitting energization of the incandescent lamp B.

In addition, the total voltage (12 volts) of the eight batteries A1 to A8 are supplied to the input terminal $I_1$ and $I_2$ of the inverter I. The output terminals $I_3$ and $I_4$ of the inverter are in turn connected through conductors to jack pins 2 and 2' which are connected with the fluorescent lamp C. As illustrated in FIG. 2, the other switch $S_c$ is series connected between the batteries and the inverter input terminal $I_2$.

OPERATION

In operation, if only switch $S_b$ is manually closed, this then energizes only incandescent lamp B. The light energy is reflected from the parabolic or conical reflector $R_1$, so that a concentrated directional light beam is emitted in the axial direction of the reflector. Due to this concentration, the light beam will thus permit lighting over a long distance.

On the other hand, if only switch $S_c$ is manually closed, then the direct current voltage from the batteries is supplied to the inverter I which converts it to alternating current, which in turn energizes the ring-shaped fluorescent lamp B. This lamp emits light which, due to the position of the lamp adjacent the front of the housing opening, and due to the disorderly reflection of this light from the curved reflector $R_2$, results in the light being diffused outwardly and sidewardly in a substantially uniform manner so that the region surrounding the portable lamp means is thus effectively lighted with substantial uniformity, which lighting occurs sidewardly over substantial breadth but obviously extends over a much shorter distance than is achieved by the incandescent lamp B.

If desired, switches $S_b$ and $S_c$ can be both closed at the same time, whereby both incandescent lamp B and fluorescent C will be simultaneously energized, thereby providing both a long-distance concentrated beam of light and short-distance diffused lighting.

The present invention, as described above, thus permits efficient and effective directional or diffusive lighting, either individually or jointly. At the same time, the portable electric lamp means of the present invention is convenient and efficient to use, while at the same time possessing extreme portability. Further, in view of the substantially concentric relationship between the incandescent and fluorescent lamps, the lighting from these lamps does not disturb or interfere with one another, particularly since the curved reflector $R_2$ is connected to and extends outwardly from the free edge of the parabolic reflector $R_1$, and the ringlike fluorescent lamp C is arranged inside of the bowl-like reflector $R_2$. This resulting structure is also desirably compact.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a portable electric lamp structure having a housing, provided with an opening at one end thereon, a light-transmitting lens mounted on said housing for covering said opening, a substantially annular parabolic reflector mounted on the housing and opening outwardly toward said lens, an incandescent lamp positioned substantially at the focal part of said parabolic reflector, a self-contained direct-current electric power source positioned within the housing, and manual switch means for electrically connecting the power source to the incandescent lamp for energizing same, the improvement comprising a curved annular reflector disposed adjacent the outer free edge of said parabolic reflector and extending radially outwardly therefrom, said curved reflector having the radially inner edge thereof positioned in close proximity to the radially outer edge of said parabolic reflector, said curved reflector being of a smooth curvature as it projects radially outwardly from said inner edge so as to also project axially forwardly from the outer edge of said parabolic reflector toward said lens, a ringlike fluorescent lamp positioned rearwardly of said lens and in front of said curved reflector in concentric relationship with said parabolic reflector, said ringlike fluorescent lamp having a diameter which is of a magnitude at least similar to the diameter of the parabolic reflector adjacent its outer free edge, inverter means electrically connected to said fluorescent lamp for converting direct current to alternating current, said switch means being electrically connected between said power source and said inverter means and including a first manually-actuated switch connected electrically in series between said power source and said incandescent lamp and a second manually-actuated switch connected in series between said power source and said fluorescent lamp, whereby said lamps may be energized individually or jointly, said lens including a substantially flat center portion which is substantially aligned with the parabolic reflector and is positioned so as to be coaxially aligned with the open region defined within the interior of the ringlike fluorescent lamp, said ringlike fluorescent lamp being disposed radially outwardly of said center portion, said lens also including an outer annular portion which surrounds said center portion and is of a smoothly curved and outwardly rounded convex configuration when viewed in a radial plane, said curved outer portion of the lens cooperating with the curved reflector to define an enlarged annular region therebetween, and said ringlike fluorescent lamp being disposed in said annular region so that the curved convex outer portion of the lens provides for more uniform sideward diffusion of light over a large transverse area when the ringlike fluorescent lamp is energized.

2. A lamp structure according to claim 1, wherein said housing comrises an elongated tubular housing element which has said opening formed at one end thereof, said reflectors being mounted within said housing element adjacent said one end, and said direct-current power source being removably positioned within said housing element adjacent the other end thereof.

* * * * *